United States Patent [19]
Schönfeld

[11] Patent Number: 5,179,916
[45] Date of Patent: Jan. 19, 1993

[54] PISTON WITH A ROTATABLE PISTON TOP

[75] Inventor: Dieter Schönfeld, Markdorf, Fed. Rep. of Germany

[73] Assignee: MTU Motoren- und Turbinen-Union, Friedrichshafen, Fed. Rep. of Germany

[21] Appl. No.: 806,357

[22] Filed: Dec. 31, 1991

[30] Foreign Application Priority Data

Dec. 22, 1990 [DE] Fed. Rep. of Germany ....... 4041637

[51] Int. Cl.⁵ .............................................. F02B 75/04
[52] U.S. Cl. ................................ 123/48 B; 123/193.6; 92/217
[58] Field of Search ............... 123/48 B, 78 B, 193.6; 92/82, 216, 217, 255, 60.5

[56] References Cited

U.S. PATENT DOCUMENTS

| 2,029,169 | 1/1936 | Hironaka | 123/48 B |
| 2,153,691 | 4/1939 | Hironaka | 123/48 B |
| 2,647,683 | 8/1953 | Schweller | 123/48 B |
| 4,031,868 | 6/1977 | Karaba et al. | 92/216 |
| 4,079,707 | 3/1978 | Karaba et al. | 123/78 B |
| 4,342,291 | 8/1982 | Lewis | 123/193.6 |
| 4,510,895 | 4/1985 | Slee | 123/48 B |
| 4,864,977 | 9/1989 | Hasegawa | 123/48 B |

FOREIGN PATENT DOCUMENTS

| 680266 | 8/1939 | Fed. Rep. of Germany . |
| 705283 | 4/1941 | Fed. Rep. of Germany . |
| 1179047 | 10/1964 | Fed. Rep. of Germany . |
| 2201299 | 11/1972 | Fed. Rep. of Germany . |
| 3127865 | 2/1983 | Fed. Rep. of Germany .... 123/48 B |
| 3404343 | 8/1985 | Fed. Rep. of Germany . |
| 4018344 | 6/1990 | Fed. Rep. of Germany . |

Primary Examiner—David A. Okonsky
Attorney, Agent, or Firm—Barnes & Thornburg

[57] ABSTRACT

This invention relates to a two piece piston with a variable compression height, wherein a piston top part can be adjusted with respect to a piston bottom part along the longitudinal axis of the piston preferably by hydraulic devices and can be caused to perform a progressive rotating movement. This rotating movement is achieved by means of two thread sections of opposed pitch which, depending on the moving direction of the piston top part, alternately engage in corresponding counterthread sections on the piston bottom part. These threads and counterthreaded sections are multiple coarse pitch threads and are located on one side only as flanks disposed in the moving direction of the piston top part so that when the moving direction of the piston top part is reversed, a moving-apart of the engaged thread sections and counterthread sections occurs and the thread sections with an opposed pitch engage correspondingly on the flanks on the corresponding counterthread sections. In this case, either the thread sections assigned to the piston top part or the counterthread sections assigned to the piston bottom part are arranged offset with the respect to one another in the circumferential direction, by slightly less than the amount which corresponds to the rotation of the piston top part in the case of a certain stroke.

8 Claims, 1 Drawing Sheet

PISTON WITH A ROTATABLE PISTON TOP

BACKGROUND AND SUMMARY OF THE INVENTION

This invention relates to a two part piston with a rotatable piston top for an internal-combustion engine. The piston top comprises a piston head and the piston ring zone. The piston top is movable upward and downward with respect to the piston bottom connected with the connecting rod to obtain a variable compression height. The piston top is provided with a thread section which engages in a counterthread section on the piston bottom. Such a structure is generally known from the German Patent Document DE-PS 705 283.

The piston top in German Patent Document DE-PS 705 283, (which comprises the piston head) can be adjusted in the direction of the longitudinal axis of the piston with respect to the piston bottom connected with the connecting rod in order to change the compression ratio as a function of the operating condition of the internal-combustion engine. For this purpose, the piston top is connected with a rod which penetrates the piston bottom and has an external toothing. By the shifting of a toothed rack, which engages in the external toothing of the rod, the piston top can be rotated with respect to the piston bottom. The rotation of the piston top at the same time causes its vertical adjustment because the rod connected with the piston top has a thread which engages in a thread on the piston bottom. The described arrangement cannot be implemented in series production engines at reasonable cost because of the expensive and complicated mechanism.

In the case of a piston according to German Patent Application with the File Number P 40 18 344.0, which has not yet been published, the adjustment of the piston top with respect to the piston bottom takes place as a function of the inertia forces, the gas forces and the frictional forces. Pressure-medium-filled chambers and a pressure control valve are arranged in the piston. The compression ratio will change as a function of the resulting pressure medium pressure. In addition, the piston top is freely rotatably disposed with respect to the piston bottom. However, no possibility is indicated as to how the piston could be caused to perform a positive rotation which, as known, is advantageous with respect to the durability of the piston.

In the German Patent Document DE-AS 11 79 047, a piston is caused to perform a progressive rotating movement in order to achieve a lower wear and a lower tendency to scuff the piston. Because of the rotating movement, the piston bottom is kept free of deposits, such as carbon deposits. In order to permit the rotating movement, the piston is disposed by means of a spherical head. The compression height is unchangeable. The piston bottom is constructed in one piece with the piston skirt. The rotating movement of the piston is achieved by means of a mass which is caused, to perform a rotating movement by the axial movement of the piston. For this purpose, a threaded spindle is used on which a disk is arranged which is guided by means of a counterthread. Because of the axial acceleration forces of the piston, the disk experiences a helical rotating movement. Because of the effect of the inertia forces and frictional forces, a progressive rotating movement of the piston is caused when the normal braking movement of the disk differs in the upper and lower end position.

It is an object of the instant invention to cause a progressive rotating movement of the piston top as the piston top is adjusted in the longitudinal axis of the piston with respect to the piston bottom, the rotation of the piston top not being the cause for its stroke movement.

In order to achieve this object, in a piston with a variable compression height of the initially mentioned type, the invention provides two circumferences on the piston top with multiple threaded sections with opposed pitch and which engage in corresponding counterthread sections on the piston bottom. The position of the thread sections with respect to the longitudinal axis of the piston is a function of the maximally possible travel of the piston top part with respect to the piston bottom part. The matching thread sections and counterthread sections alternately engage, depending on whether the piston top moves upward or downward. Thus, during the reversal of the moving direction of the piston top, a moving-apart of the momentarily engaged thread sections and counterthread sections is possible. The thread sections and the counterthread sections rest only on one side of flanks situated in the moving direction. The maximally possible rotation of the piston top per stroke depends on the thread pitch. Corresponding to the thread pitch, an offsetting must also be provided either of the thread sections or of the counterthread sections so that the progressive rotation of the piston top is achieved.

It is further desireable if the flanks of the threaded sections and counterthreaded sections providing the engagement are constructed as lateral surfaces on radially projecting projections. Here the thread sections on the piston top part are located on a single projection of a series of projections and these projections are arranged between two rows of projections of the counterthread sections, whose flank are offset about the circumference of the piston bottom part. Alternatively the counterthreaded sections on the piston bottom part can be located on a single projection of a series of projections, and these projections are arranged between the two rows of projections of the threaded sections whose flank are offset about the circumference of the piston top part.

It is further desireable if a hydraulic device is provided for the adjustment of the piston top part with respect to the piston bottom part along the axis of the piston. The lateral surfaces of radial projections are used as thread flanks, in which case different lateral surfaces on one projection may represent thread flanks of a differing pitch. Particularly advantageously, the invention can be used in the pistons with a variable compression height in which hydraulic devices are used for the adjustment of the piston top.

Other objects, advantages and novel features of the present invention will become apparent from the following detailed description of the invention when considered in conjunction with the accompanying drawings.

DETAILED DESCRIPTION OF THE DRAWINGS

Figure 1:
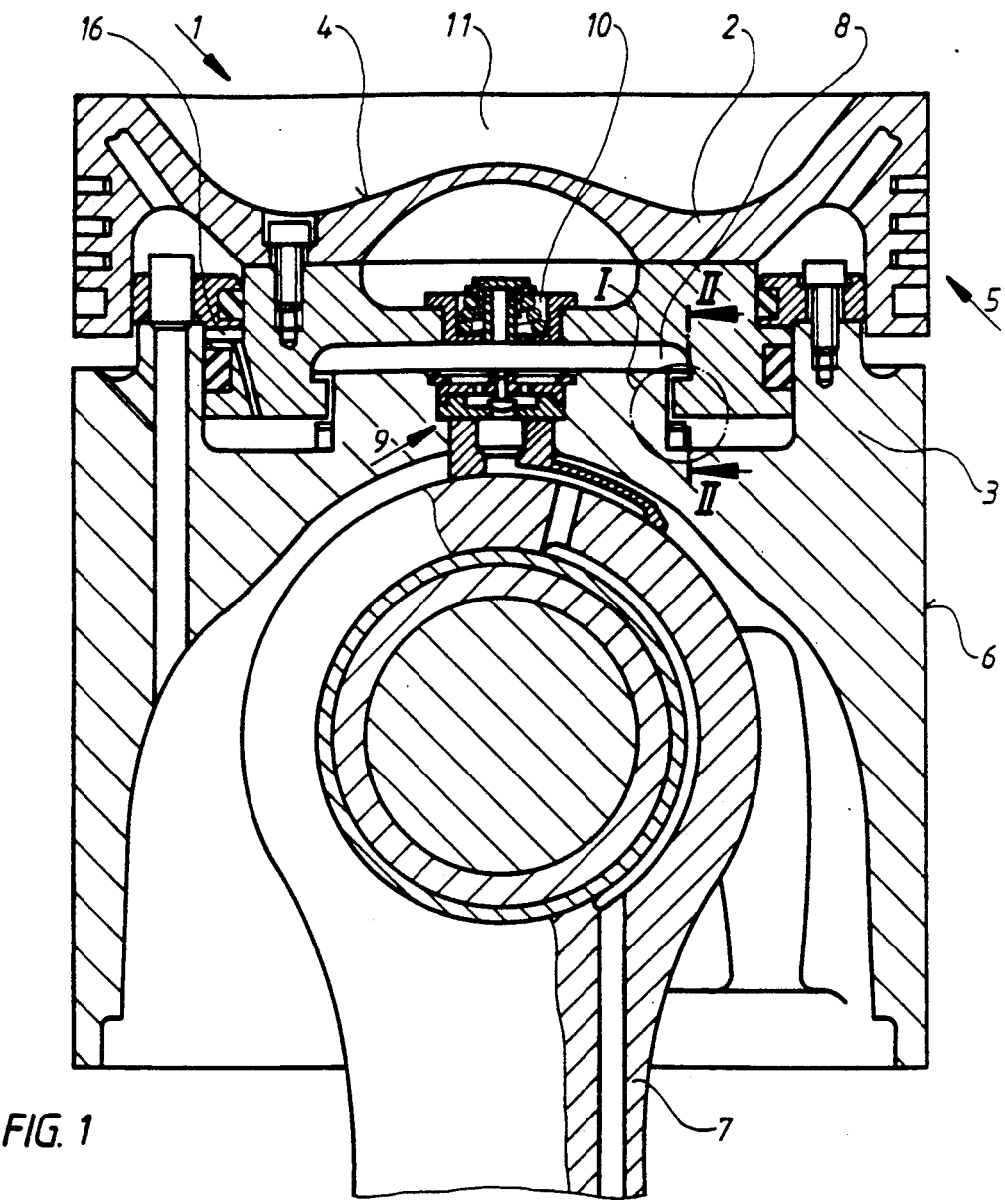
FIG. 1 is a cross-sectional view of a two part piston having a variable compression height and a piston top part which can be progressive rotated.

In FIG. 1 a two part piston 1 is illustrated in a cross-sectional view. Here the piston top part 2 is constructed to be displaceable with respect to the piston bottom part 3 in the direction of the longitudinal axis of the piston for the purpose of a variable compression height. The piston top part 2 comprises the piston head 4 and the piston ring zone 5. The piston bottom 3 comprises the piston skirt 6 which is hinged to the connecting rod 7. Between the piston top 2 and the piston bottom 3 parts is a chamber 8 to which a pressure medium is fed by way of a flap valve 9. A pressure control valve 10 forms the discharge for the pressure medium from the chamber 8. The axial position of the piston top 2 is a function of the inertia forces, gas forces and frictional forces affecting the piston top 2. Because of the inertia forces affecting the piston top 2, the piston top 2 moves upward with respect to the piston bottom 3 when the piston is in the proximity of upper dead center position during a decreasing load of the internal-combustion engine and correspondingly low gas forces. Under these conditions pressure medium flows into the chamber 8. When the load increases again, the pressure control valve 10 opens up because of the increasing gas forces. Under these conditions the compression ratio becomes smaller. Thus it can be seen that the piston top part 2 moves downward toward the piston bottom with an increasing load of the internal-combustion engine, and when the load of the internal-combustion engine decreases, it moves upward, away from the piston bottom part 3. The gas forces, which differ considerably in the intake stroke and the compression stroke, cause only slight displacements of the piston top 2 with respect to the piston bottom 3 because of hydraulic damping at chamber 16.

Figure 2:
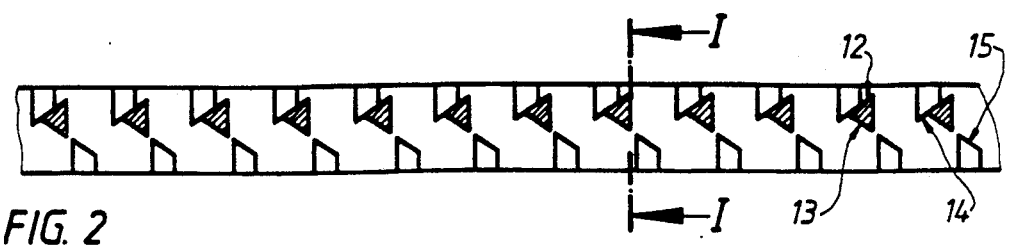
FIG. 2 is a sectional view along the intersection line II—II of FIG. 1 which represents a developed view of the thread sections and counterthread sections that provide the progressive rotation.

In order to achieve a progressive rotating movement of the piston top 2, thread sections 12, 13 are arranged on an inner circumference of the piston top 2 and engage in counterthread sections 14 and 15 on the piston bottom 3. The thread sections and counterthread sections 12, 13 and 14, 15 are constructed as radially projecting projections with oblique lateral surfaces forming the thread flanks. The construction of the projections is shown in FIG. 2 which represents an enlarged view of the development of the thread sections and counterthread sections along intersection line II—II in FIG. 1. In FIG. 1, the thread sections and counterthread sections are illustrated in a view I in the viewing direction of the arrows to the intersection line I—I of FIG. 2. Three rows of projections are provided. The uppermost and lowermost row of projections are arranged on the piston bottom part 3. The oblique lateral surfaces form the counterthread sections 14 and 15. This is a multiple coarse pitch thread. The pitches of the flanks of the upper and lower row are opposed. In addition, the projections of the upper and lower row are arranged to be offset on the circumference, specifically by slightly less than the amount which corresponds to the provided rotation, for a full travel movement of the piston top part 2 The thread sections 12 and 13, which are assigned to the piston top part 2, as shown in FIG. 2, are assigned to a third row of projections which with their upper oblique lateral surfaces (during an upward movement of the piston top part 2) engage with the thread flanks of the counterthread section 14, and during a downward movement of the piston top part 2, their lower oblique lateral surfaces come into an engagement with the flanks of the counterthread section 15. Since the matching thread sections and counterthread sections each come to rest on one side only on the flanks situated in the moving direction, a moving-apart may take place, in the case of a travel reversal, of the thread sections and counterthread sections which previously had been engaged. Because of the opposed pitches of the thread sections which are alternately engaged in the case of a load reversal, a rotation in the same direction is obtained irrespective of the moving direction of the piston top part 2. However, it is a prerequisite that the travel movement of the piston top 2 is large enough that a rotation of the piston top part 2 takes place which is larger than the offsetting of the counterthread sections 14 and 15. In order to keep the top land free of carbon and other deposits, it is sufficient for the piston top part 2 to only now and then carry out a small rotating movement when a sufficiently large load change and corresponding stroke movements of the internal-combustion engine take place for changing of the compression ratio.

Naturally, the thread sections 12, 13 may also be arranged on the piston bottom part 3 instead of the counterthread sections 14 and 15, and vice versa, the counterthread sections 14, 15 may be arranged on the piston top 2. The thread sections 12, 13 may also be assigned to separate rows of projections, and the projections of these rows may be arranged to be offset with respect to one another on the circumference. The counterthread sections 14, 15 will then not be offset with respect to one another.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A variable compression internal-combustion engine piston having a rotatable piston top head part with a piston ring zone;

a piston bottom skirt part connected to a connecting rod, the piston top part, being movable upward and downward with respect to the piston bottom part;

the piston top part being provided with a first threaded section which engages with a first counterthreaded section on the piston bottom part, the improvement comprising:

the first threaded section and the first counterthreaded section are constructed as multiple coarse pitch threads;

the first threaded section and the first counterthreaded section causing the piston top part to rotate during an upward movement of the piston top part with respect to the piston bottom part;

a second threaded section with an opposed pitch is arranged on the piston top part;

said second threaded section engages a second counterthreaded section on the piston bottom to cause the piston top part, during a downward movement of the piston top part to perform a rotation in the same direction as during the upward movement; and wherein during a reversal of movement of the piston top part, movement takes place between engaged threaded sections and counterthreaded sections so that one of the threaded section is displaced with respect to its perspective counterthreaded section in a circumferential direction.

2. The piston according to claim 1, wherein the flanks of the threaded sections and counterthreaded sections provided for engagement are constructed as lateral surfaces on radially projecting projections.

3. The piston according to claim 2, wherein the first and second threaded sections on the piston top part are located on the same projections, and wherein these projections are arranged between two rows of projections of the first and second counterthreaded sections whose flanks are offset about a circumference of the piston bottom part.

4. The piston according to claim 2, wherein the first and second counterthreaded sections on the piston bottom part are located on the same projections; and wherein these projections are arranged between the two rows of projections of the first and second threaded sections whose flanks are offset on the circumference.

5. The piston according to claim 1, wherein a hydraulic device is provided to move the piston top part with respect to the piston bottom part.

6. The piston according to claim 2, wherein a hydraulic device is provided to move the piston top part with respect to the piston bottom part.

7. The piston according to claim 3, wherein a hydraulic device is provided to move the piston top part with respect to the piston bottom part.

8. The piston according to claim 4, wherein a hydraulic device is provided to move the piston top part with respect to the piston bottom part.

* * * * *